United States Patent [19]
Bordener

[11] Patent Number: 5,868,957
[45] Date of Patent: Feb. 9, 1999

[54] MOLD ASSEMBLY FOR CREATING A SOLID-SURFACE COUNTERTOP HAVING A BUILT-UP EDGE EXHIBITING A NON-CONSTANT OUTER RADIUS

[75] Inventor: Robert Bordener, Bloomfield Hills, Mich.

[73] Assignee: Talon Surfaces, LLC, Troy, Mich.

[21] Appl. No.: 796,200

[22] Filed: Feb. 7, 1997

[51] Int. Cl.⁶ .................................................. B29C 41/08
[52] U.S. Cl. ...................... 249/114.1; 249/117; 249/155; 264/255; 264/309
[58] Field of Search .................................. 249/91, 114.1, 249/115, 116, 117, 154, 155, 161, 164; 264/161, 255, 308, 309

[56] References Cited

U.S. PATENT DOCUMENTS

| | | | |
|---|---|---|---|
| 3,373,233 | 3/1968 | Rondum | 264/462 |
| 3,635,642 | 1/1972 | Mueller | 249/155 |
| 4,102,374 | 7/1978 | Klein | 144/346 |
| 4,397,798 | 8/1983 | Parten | 264/46.5 |
| 4,829,730 | 5/1989 | Zeilinger | 52/287.1 |
| 4,837,997 | 6/1989 | Zeilinger | 52/280 |
| 4,958,888 | 9/1990 | Livnah | 312/140.3 |
| 5,260,007 | 11/1993 | Efstratis et al. | 264/35 |
| 5,330,262 | 7/1994 | Peters | 312/140.4 |
| 5,354,592 | 10/1994 | Miskell | 428/115 |
| 5,452,666 | 9/1995 | Peters | 108/27 |
| 5,453,287 | 9/1995 | Close | 249/155 |
| 5,628,949 | 5/1997 | Bordener | 264/161 |

*Primary Examiner*—Jay H. Woo
*Assistant Examiner*—Joseph Leyson
*Attorney, Agent, or Firm*—Gifford, Krass, Groh, Sprinkle, Patmore, Anderson & Citkowski, P.C.

[57] ABSTRACT

A mold assembly for creating a resin casted countertop exhibiting a built-up edge having a non-constant radius. The mold assembly includes a substantially horizontally planar and upwardly facing mold surface and a plurality of elongated member which are releasably securable upon the planar mold surface to create an outline of a countertop product to be produced. Each of the elongated members include a planar edged top, a likewise planar edged bottom, a rear face and an inwardly contoured front face. The inwardly contoured front face includes a first constant center radius throughout a first degree of angular rotation and at least one additional upper and/or lower constant center radii throughout additional degrees of angular rotation proximate the top and bottom locations of the inwardly contoured front face. The inwardly contoured face permits the application of a liquid form surface coat material and prevents the pulling away or sagging of the surface coat during gelling or hardening and prior to the application of at least one back coat of material.

8 Claims, 2 Drawing Sheets

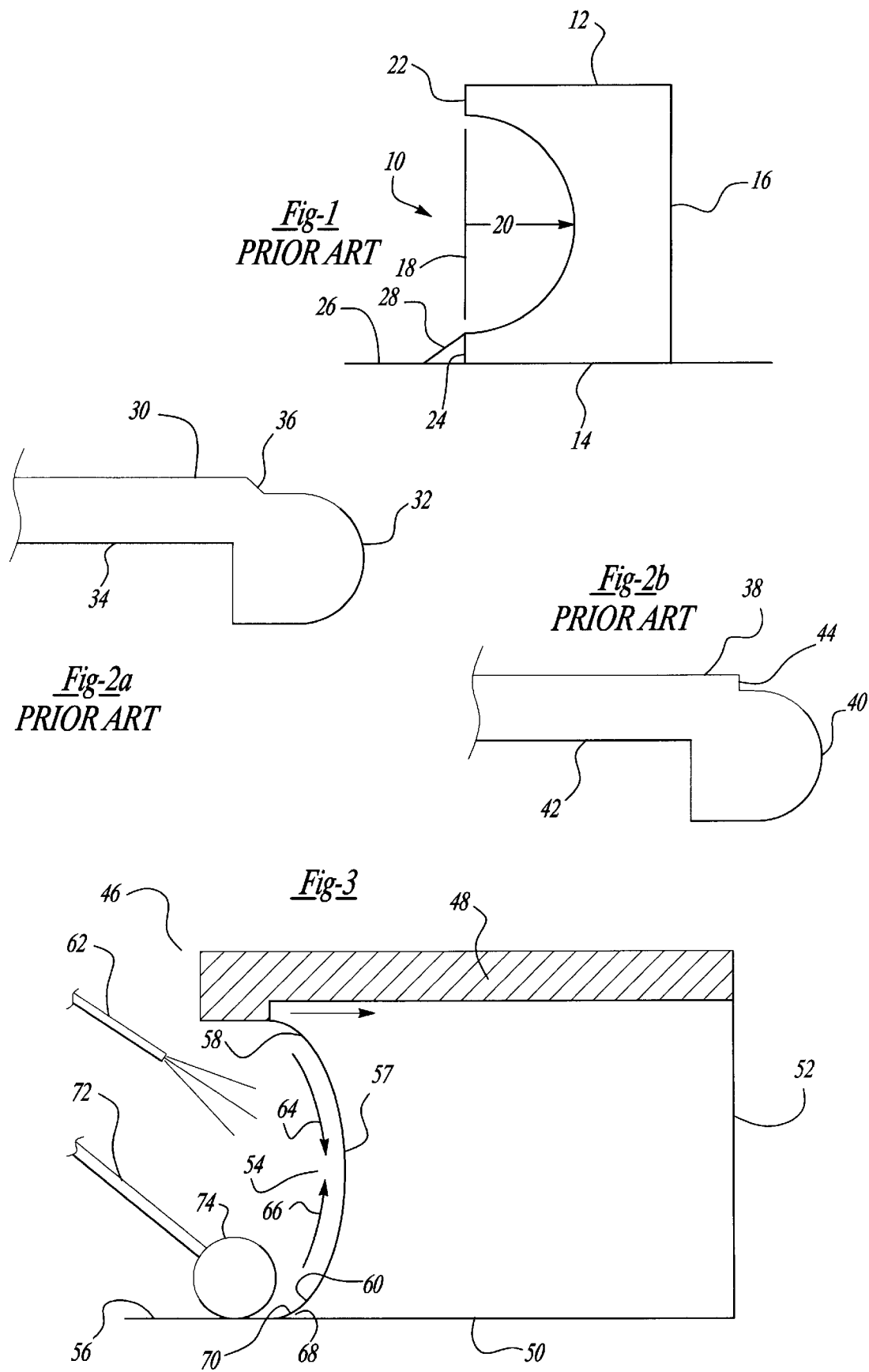

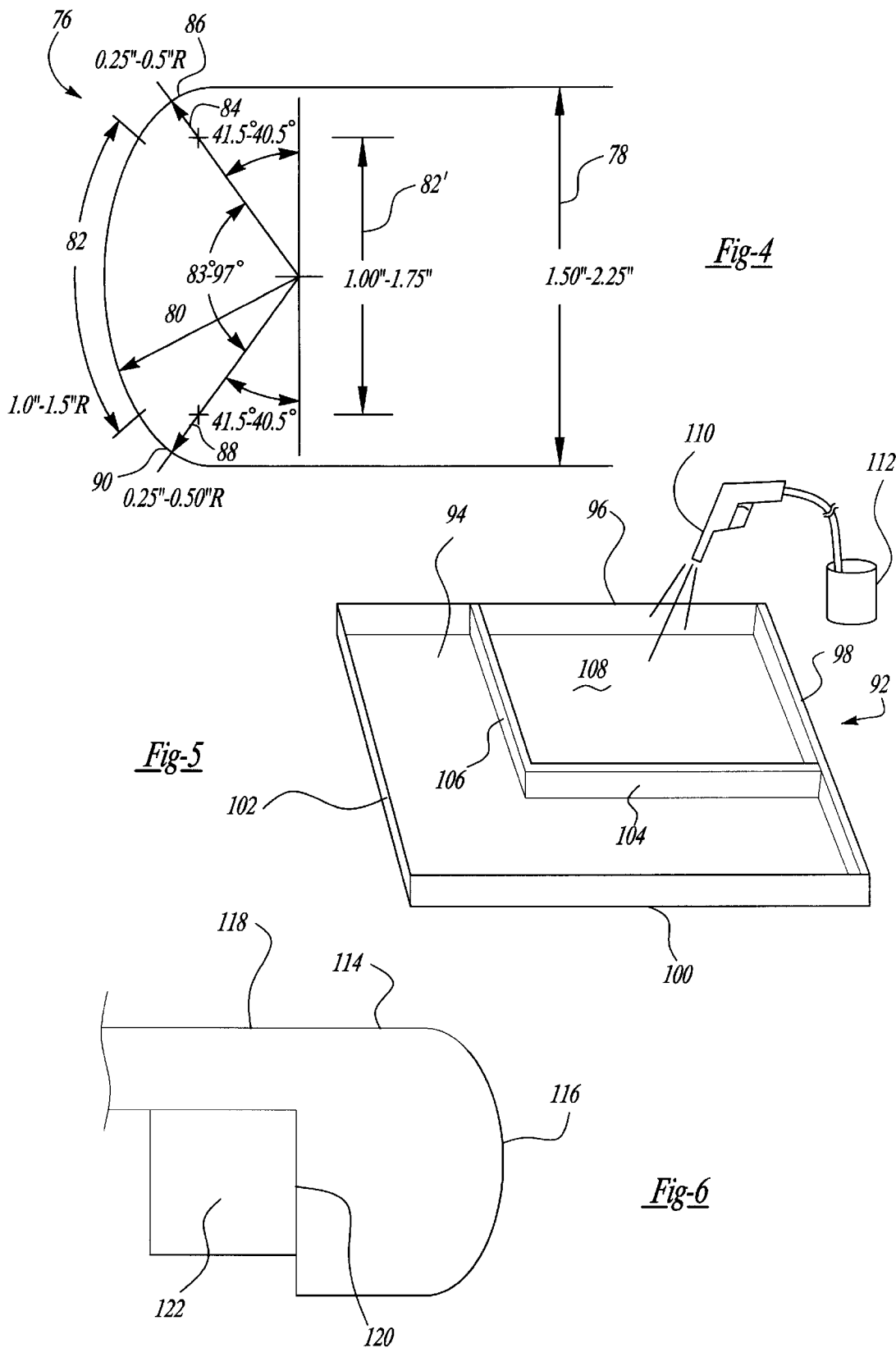

MOLD ASSEMBLY FOR CREATING A SOLID-SURFACE COUNTERTOP HAVING A BUILT-UP EDGE EXHIBITING A NON-CONSTANT OUTER RADIUS

BACKGROUND OF THE INVENTION

1. Field of the Invention

The present invention relates generally to solid surface countertop technology and, more particularly, to the production of a solid-surface countertop exhibiting a substantially flattened and outer built-up edge having a non-constant radius and with a non-tangential intersection with an upwardly facing mold surface.

2. Description of the Prior Art

A recent trend in solid-surface countertop technology is the production of resin cast countertops within open and negatively shaped mold enclosures. Applicants copending application Ser. No. 08/416,133, filed Apr. 4, 1995, now issued as U.S. Pat. No. 5,628,949 on May 13, 1997, discloses a mold process for producing a finished cultured marble countertop in which the mold includes a plurality of side members which are inwardly contoured in a generally bull-nosed fashion to facilitate the creation of a built-up edge. The side members are typically adhesively secured upon the mold surface and an outwardly curved bottom portion of the inwardly contoured side usually forms a flat outer face over which must be applied a wax or clay fillet in order to produce a substantially smoothed edge surface. The process for constructing a countertop according to this disclosure includes the steps of spraying or otherwise applying a high-quality solid surface coating onto the mold surfaces and particularly the sides, backfilling with a low-grade plasticized resin and then constructing a dam in proximity and parallel to the edges of the mold for a subsequent material pour and in order to create the built-up edge.

Also disclosed in the prior art are other variations of countertops exhibiting a built-up edge, among which are included U.S. Pat. No. 3,373,233, issued to Rondum which discloses a method for molding countertops in which a plastic laminated overlay is molded with wood chip and resin composites and, the end product of which displays an outer edge such as is shown in FIG. 6.

U.S. Pat. No. 5,354,592, issued to Miskell, teaches a solid surfacing edge treatment method and article which incorporates a number of differently configured edge treatment members. While not having any relevant application to the production of a resin pour molded countertop, Miskell does illustrate (FIGS. 11–14) some interesting variations of a bull-nosed countertop edge.

The shortcoming of the prior art mold assemblies, particularly when taking into account the creation of a solid surface countertop as disclosed in the 416,133 application, is the inability to consistently provide for an even and high quality edge finish to the bull nose. This is often a result of both the initially sprayed high quality surface coat pulling away or otherwise sagging when sprayed onto the inwardly contoured mold sides, the sides often being semicircular in shape, as well as the inability of the applied clay fillet to adequately replicate a tangential edge curvature from the semi-spherical bull nose contour to the horizontal mold face.

SUMMARY OF THE PRESENT INVENTION

The present invention is a mold assembly for creating a resin casted solid surface countertop which exhibits a built-up edge and having a non-constant radius. The mold assembly includes a substantially horizontally disposed and planar mold surface such as a TEFLON® coated or similarly constructed mold surface. At least one elongated member is secured upon the planar mold surface and preferably a plurality of such elongated members are typically provided and are secured by adhesives, glues or the like in a temporary fashion to produce a rectangular L-shaped or U-shaped mold enclosure which defines a shape of a countertop product to be produced.

The elongated members may be either straight, curved, angled or provided according to any desired shape and each includes a top, a bottom, a rear face and an inwardly contoured front face which defines a negative of a bull nosed edged countertop to be produced. The inwardly contoured face includes a first constant center radius throughout a first degree of angular rotation defined from a center point of the bull nosed edge. According to the preferred embodiments, the first degree of angular rotation is preferably in a range of 83 degrees to 97 degrees rotation for edge thickness variations of between 1 inch and 2.25 inches.

The inwardly contoured front face further includes at least one second upper and lower constant edge radius proximate to the upper and lower edges of the elongated mold defining member and throughout at least one second degree of angular rotation. In a first preferred embodiment the second constant edge radii are provided according to the same value at positions proximate both the upper and lower portions of the inwardly contoured mold face, with the resulting desired effect being the creation of a somewhat flattened bull nose edged surface having a non-constant radius. According to a second preferred embodiment, either the upper or lower edge radii are provided according to differing values to modify the appearance of the bull nose of the countertop product to be produced. The objective of the present invention carried out by this novel and useful bull nose design is the ability of the inwardly contoured front face to receive the application of a liquid form surface coat material such as is used in creating a resin cast solid surface countertop and without the undesirable effects of the surface coat sagging or pulling away from the mold surface during the gelling and hardening stages.

Additional inventive features include the formation of a more closely matching bottom edge surface of the inwardly contoured front face in relationship with the flat horizontal surface of the mold so as to permit the application of a thin elongated strip of wax or clay fillet with a fillet tool and to more closely match a corresponding top edge surface of the countertop product to be produced. A mold process for producing a solid surface countertop is further described which utilizes the bull nosed or waterfall shaped design according to the present invention.

BRIEF DESCRIPTION OF THE DRAWING

Reference will now be had the accompanying drawings, when read in combination with the following specification, wherein like reference numerals refer to like parts throughout the several views, and in which:

FIG. 1 is a view of an elongated mold defining member in side profile according to the prior art;

FIG. 2a is a two dimensional side view of a solid surface countertop produced by elongated mold defining members as shown in FIG. 1 and illustrating a first undesirable characteristic of such mold defining members;

FIG. 2b is a likewise two dimensional side view of a solid surface countertop produced by elongated mold defining members as shown in FIG. 1 and illustrating a yet further undesirable characteristic of such mold defining members;

FIG. 3 is a side profile of an elongated mold enclosure defining member according to the present invention;

FIG. 4 is a side profile illustrating the degrees of angular rotation of the first and second radii according to which the overall non-constant radial edge of the bull nose is constructed;

FIG. 5 is a perspective view of a mold process for creating a solid surface countertop which utilizes the bull nose design according to the present invention; and FIG. 6 is a view of a finished bull nose edged solid surface countertop produced according to the present invention.

DETAILED DESCRIPTION OF THE PREFERRED EMBODIMENTS

Referring now to FIGS. 1, 2a and 2b, an explanation of the prior art attempts to produce a bull nose edged solid surface countertop will be made prior to a description of the mold assembly according to the present invention and as will be subsequently had upon reference to FIGS. 3–6. The purpose of this initial description is to illustrate the shortcomings of conventionally designed mold defining members which is sought to be improved upon by the mold assembly of the present invention.

Referring again to FIG. 1, a side profile of an elongated mold defining member 10 according to the prior art is illustrated and includes a top edge 12, a bottom edge 14 and a rear edge 16, all of which are preferable planar in shape and define three sides of a rectangle in cross section. A front face 18 includes a substantially inwardly shaped contour 20 which, according to the side profile illustrated, is semicircular in shape. Flattened outer edge portions of the inwardly contoured front face 18 are illustrated at 22 and 24 corresponding to top and bottom edge portions and the bottom edge 14 of the one or more mold defining members utilized to create the surrounding mold enclosure is secured to an upwardly facing mold surface 26 by adhesives, glues or the like (not shown).

A clay or wax fillet 28 is applied in the angled corner defined between the bottom edge portion 24 and the mold surface 26. As shown upon reference to FIGS. 2a and 2b, some undesirable characteristics of a bull nose shaped countertop product produced utilizing the mold defining members as shown in FIG. 1 are illustrated. As shown in FIG. 2a, a countertop 30 is illustrated in side profile and includes an outer thickness expanded bull nosed profile 32 which connects to an interior and reduced thickness planar top portion 34. A common characteristic of the countertop 30 produced according to this process is the creation of an uneven or dipping portion 36 in the region between the bull nose profile 32 and the planar top portion 34 which is a result of the fillet of material 28 not creating a smooth tangential translation into the planar mold surface.

Referring to FIG. 2b, a further characteristic of a countertop 38 produced utilizing the elongated mold defining members of FIG. 1 is illustrated and the countertop 38 likewise includes a bull nose profile 40 and a planar top portion 42 similar to FIG. 2a. The countertop 38 further displays a generally stepped portion 44 between the bull nose profile 40 and the planar top portion 42 and this is commonly the result of either the failure to provide a fillet or the provision of an inadequate fillet of material.

Referring now to FIG. 3, an elongated mold defining member 46 is illustrated in side profile according to the mold assembly of the present invention and includes a top 48, a bottom 50, a rear face 52 and an inwardly contoured front face 54. The top, bottom and rear are all preferably planar in surface shape and the bottom 50 is secured atop a planar and horizontal mold surface 56 again using adhesives, glues or the like (not illustrated) as is conventionally known in the art. The inwardly contoured front face 54 exhibits an overall non-constant radius and includes a first constant center radius defined by surface portion 57 and at least one second constant edge radius proximate the top and bottom, as illustrated by surface portions 58 and 60, respectively.

The desired effect of the inwardly contoured front face 54 is to provide it with a substantially more flattened shape as contrasted with the generally more semicircular shape of the prior art dividing members shown in FIG. 1. The advantage of the more flattened, non-constant radial surface is to permit the application of a surface coat of a high quality liquid coating of material and prior to the application of one or more coatings of a backfill material. The initial high quality coating is preferably in the form of a spray issued from a spray nozzle 62 which is applied evenly over the horizontal and planar surface 56° of the molds as well as the inwardly contoured front faces 54 of the one or more elongated mold defining members which make up the countertop enclosure.

The purpose of the initial spray coat is to apply a high quality resin or like material evenly across all of the flat and contoured side mold surfaces, preferably to a thickness of between 0.010 mils to 0.025 mils (10 thousandths to 25 thousandths of an inch). This is subsequently followed by the application of at least one, and usually two, backpours of a low grade backer material to a complete thickness of between 1.50" and 2.25". Opposing force vectors 64 and 66 are shown in FIG. 3 and illustrate a desirable effect of the flattened, non-constant radius of the inwardly contoured front face, that being the ability to retain the sprayed high quality coat in continuous and even thickness contact with the curved edges of the mold defining members and without incidence of sagging or pulling away of the surface coat from the mold surface. In contrast, a more conventionally designed semi-circular mold surface as illustrated in the mold defining members of FIG. 1 would tend to concentrate towards the lower portion of the negative cavity mold surface, with the resultant undesirable effect in the subsequently produced countertop product.

A further advantage of the elongated member design of the present invention is the provision of a substantially more narrowed "knife edge" in the proximity of the bottom surface portion 60 of the inwardly contoured face 54. The knife edge is illustrated at 68 and forms a much thinner edge face contacting the horizontal planar mold surface 56 than that which is illustrated at 24 in the elongated member according to FIG. 1. As a consequence, a lesser amount of a fillet material 70 is needed and, upon application of a fillet tool 72 with a bulbous forming head portion 74, the bottom surface portion 60 intersects nicely with the horizontal mold surface and the knife edge 68 formed by the bottom surface portion 60 " translates in a smooth and non-tangential manner into the planar mold surface 56 to produce a bull nosed countertop product having a smooth and flattened outer contour as will be subsequently described.

Referring now to FIG. 4, a similar edge profile 76 is illustrated in schematic of a bull nosed countertop edge according to the mold assembly of the present invention. An overall thickness of the bull nose edge profile is preferably in a range of between 1.50" and 2.25" (inches) and is illustrated at 78. The first constant center radius is illustrated at 80 and preferably extends an angular degree of rotation of between 83 degrees and 97 degrees depending upon the selected overall thickness of the bull nosed edge profile. The linear radial component of the first center radius is preferably selected from a range of between 1.0" and 1.5" and the angular degree of rotation is further illustrated by curved line 82 and the linear component of this length is shown at 82' as being in a range of between 1.00" and 1.75".

A second top edge radius is shown at 84 and illustrated over a degree of rotation 86. A third bottom edge radius is likewise shown at 88 and illustrated over a degree of rotation 90. According to a preferred embodiment, both the top edge radius 84 and bottom edge radius 88 are both of identical linear length component and degree of rotation components. These are each preferably selected from a range of between 0.25" and 0.50". The overall angular component of the edged profile equals 180 degrees. Accordingly, the degree of rotation of the radii of the top and bottom edge portions are selected according to values which complete the rotation, however assuming them to be substantially identical, they are in a range of 41.5 degrees to 48.5 degrees each when taking into consideration the 83 degree to 97 degree range of the center radius. Also, as illustrated in FIG. 4, the concluding edge profile to at least the planar mold surface is very gradual and the radial component extends ultimately to a perfectly horizontal point with ever diminishing linear values.

In any event, the top and bottom radii are sized to compensate for the larger central radius and to provide the overall bull nose configuration with a generally flattened and non-constant contour. The dimensions listed here are primarily for purposes of illustrating a preferred range of parameters which may be utilized in the creation of the countertop edge profile and are not intended to be limiting in any fashion to the inventive scope of the mold assembly.

Referring now to FIG. 5, an overall mold assembly 92 which utilizes the uniquely contoured mold defining members according to the present invention is illustrated and includes a flat mold surface 94 which is bounded by a first side 96, a second side 98, a third side 100 and a fourth side 102 in order to create a substantially rectangular shaped mold enclosure. The overall mold surface 94 is usually further subdivided by the addition of at least two additional elongated and mold defining members 104 and 106 which are constructed according to the design shown in FIGS. 3 and 4 and which, in tandem, subdivide an area 108 of the mold for the creation of the countertop product.

As is disclosed in Applicant's copending application Ser. No. 416,133, U.S. Pat. No. 5,628,949, an initial spray coat of a high grade surface material in liquid form is applied from a spray gun 110 according to a desired thickness evenly across the horizontal planar surface of the mold base and the inwardly contoured side surfaces of the mold defining elongated members. The construction of the inwardly contoured surfaces is such that the surface coat of material remains in continuous and even contact with the entire range of the non-constant radius of the bull nosed edge profile and without incidence of it either sagging or pulling away from the contoured edge surface. The initial surface coat is permitted to gel for a predetermined amount of time, usually 10 to 15 minutes, upon which a backfill of a low grade plasticized material (shown from a pour bucket 112) is provided to give the resulting product an initial backing. Subsequent steps, as described in the copending application, include the construction of a dam atop the first gelling back pour and in proximity to one or more of the inwardly contoured edges, following which a subsequent localized pour of material is made to create the overall bull nosed profile according to the desired thickness.

Referring finally to FIG. 6, a finished countertop product 114 is illustrated according to the mold assembly of the present invention and displays the desired non-constant radial and bull nosed edge profile 116 which surrounds a horizontal and reduced thickness component 118 which forms the planar top surface of the product. As is customarily known in the art a vertically extending step 120, which is a result of damming and subsequent back pouring of an additional layer of material, enables the attachment of wood battens, illustrated by batten 122 shown in side profile, and which provide a great degree of stability, strength and resistance to bending to the countertop.

The mold assembly of the present invention therefore provides a bull nosed edge profile with great aesthetic appeal and without sacrificing overhang in poor fit or tight fit installations. The present invention further provides the in-mold ability to have a more rounded profile edge design while still maintaining knife-edge ability and while still also reducing the necessary amount of fillet material which need be applied to provide the concluding edge to the top surface as well as the application and set up time associated with filleting.

Additional preferred embodiments will become apparent to those skilled in the art to which it pertains without deviating from the scope of the appended claims.

I claim:

1. A mold assembly for creating a resin casted countertop exhibiting a built-up edge having a non-constant radius, said mold assembly comprising:

a substantially horizontally disposed and planar mold surface;

at least one elongated member secured upon said planar mold surface to create an enclosure which outlines a shape of the countertop to be produced;

said at least one elongated member including a top, a bottom, a rear face, and an inwardly contoured front face which defines a negative of a bull nose edge; and said inwardly contoured front face further including a first constant center radius throughout a first degree of angular rotation and at least one second constant edge radius proximate said top and bottom and throughout at least one second degree of angular rotation;

said inwardly contoured front face permitting the application of a liquid form surface coat material and preventing the pulling away or sagging of said surface coat from said inwardly contoured mold surface during gelling and hardening and prior to the application of at least one additional back coat of material.

2. The mold assembly as described in claim 1, said first constant center radius having a linear value in a range of between 1.00" and 1.50" and said degree of angular rotation being in a range of between 83 degrees and 97 degrees.

3. The mold assembly as described in claim 1, said at least one constant edge radius having a linear value in a range of between 0.25" and 0.50" and said at least one second degree of angular rotation being in a range of between 41.5 degrees and 48.5 degrees.

4. The mold assembly as described in claim 3, said at least one constant edge radius further comprising a second top edge radius and a third bottom edge radius having identical linear and rotational values.

5. The mold assembly as described in claim 1, said inwardly contoured face further comprising a bottom edge portion having a knife edge portion terminating in a non-tangential manner into said planar mold surface.

6. A mold assembly for creating a resin casted countertop exhibiting a built-up edge having a non-constant radius, said mold assembly comprising:

a substantially horizontally disposed and planar mold surface;

at least one elongated member secured upon said planar mold surface to create an enclosure which outlines a shape of the countertop to be produced;

said at least one elongated member including a top, a bottom, a rear face, and an inwardly contoured front face which defines a negative of a bull nose edge; and said inwardly contoured front face further including a constant center radius throughout a first degree of angular rotation, said constant center radius having a linear value in a range of between 1.00" and 1.50" and said first degree of angular rotation being in a range of between 83 degrees and 97 degrees; and a top edge radius and a bottom edge radius arrayed on opposite sides of said constant center radius, said top edge radius and bottom edge radius each having an identical and second constant edge radius proximate said top and bottom of said inwardly contoured front face, respectively, and throughout second and identical degrees of angular rotation, said second constant edge radii having a linear value in a range of between 0.25" and 0.50" and said second degrees of angular rotation being in a range of between 41.5 degrees and 48.5 degrees;

said inwardly contoured front face permitting the application of a liquid form surface coat material and preventing the pulling away or sagging of said surface coat from said inwardly contoured mold surface during gelling and hardening and prior to the application of at least one additional back coat of liquid based material.

7. A mold assembly for creating a resin casted countertop exhibiting a built-up edge having a non-constant radius, said mold assembly comprising:

a substantially horizontally disposed and planar mold surface;

at least one elongated member secured upon said planar mold surface to create an enclosure which outlines a shape of the countertop to be produced, said at least one elongated member including a first member, a second member, a third member and a fourth member which are arranged in interconnecting and rectangular fashion about said planar mold surface;

selected ones of said elongated members each including a top, a bottom, a rear face, and an inwardly contoured front face which defines a negative of a bull nose edge; and said inwardly contoured front face further including a first constant center radius throughout a first degree of angular rotation and at least one second constant edge radius proximate said top and bottom and throughout at least one second degree of angular rotation;

said inwardly contoured front face permitting the application of a liquid form surface coat material and preventing the pulling away or sagging of said surface coat from said inwardly contoured mold surface during gelling and hardening and prior to the application of at least one additional back coat of material.

8. The mold assembly as described in claim 7, said first, second, third and fourth elongate and interconnected mold defining members being assembled so as to define a subset area out of a total available surface area of said planar mold surface.

* * * * *